US008509926B2

(12) United States Patent
Blevins et al.

(10) Patent No.: US 8,509,926 B2
(45) Date of Patent: Aug. 13, 2013

(54) SELF-DIAGNOSTIC PROCESS CONTROL LOOP FOR A PROCESS PLANT

(75) Inventors: Terrence L. Blevins, Round Rock, TX (US); Wilhelm K. Wojsznis, Austin, TX (US); Gregory K. McMillan, Austin, TX (US); Peter Wojsznis, Cedar Park, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 245 days.

(21) Appl. No.: 11/565,767

(22) Filed: Dec. 1, 2006

(65) Prior Publication Data

US 2007/0150079 A1   Jun. 28, 2007

Related U.S. Application Data

(60) Provisional application No. 60/742,320, filed on Dec. 5, 2005.

(51) Int. Cl.
| | |
|---|---|
| G05B 11/01 | (2006.01) |
| G05B 13/02 | (2006.01) |
| G05B 19/42 | (2006.01) |
| G06F 11/30 | (2006.01) |
| G06F 11/00 | (2006.01) |
| G21C 17/00 | (2006.01) |

(52) U.S. Cl.
USPC ............... 700/52; 700/18; 700/23; 700/26; 700/28; 700/53; 700/86; 702/183; 702/188

(58) Field of Classification Search
USPC ............. 700/28, 29, 31, 32, 52, 18, 23, 26, 700/53, 86; 702/122, 183, 188
See application file for complete search history.

(56) References Cited

U.S. PATENT DOCUMENTS

| | | | |
|---|---|---|---|
| 4,641,235 | A | 2/1987 | Shigemasa et al. |
| 5,018,215 | A | 5/1991 | Nasr et al. |

(Continued)

FOREIGN PATENT DOCUMENTS

| | | |
|---|---|---|
| CN | 1271410 A | 9/1988 |
| GB | 2 347 233 | 8/2000 |

(Continued)

OTHER PUBLICATIONS

International Preliminary Report on Patentability for International Application No. PCT/US2006/046589, dated Jun. 11, 2008.

(Continued)

*Primary Examiner* — Ronald Hartman, Jr.
(74) *Attorney, Agent, or Firm* — Marshall, Gerstein & Borun LLP

(57) ABSTRACT

A method of diagnosing an adaptive process control loop includes measuring process control loop signal data, generating a plurality of process control loop parameters from the process loop signal data and evaluating a condition of the adaptive process control loop from one or more of the plurality of process control loop parameters. The process control loop data is generated as a result of a normal operation of one or more process control devices within the adaptive process control loop when the adaptive process control loop is connected on-line within a process control environment. A self-diagnostic process control loop includes a diagnostic tool adapted to receive a diagnostic index pertaining to a process control loop parameter for each component of the process control loop and for the complete process control loop. Each diagnostic index is generated from signal data by a corresponding index computation tool. The diagnostic tool is further adapted to evaluate a condition of the process control loop from one or more of the diagnostic indices.

48 Claims, 6 Drawing Sheets

(56) References Cited

U.S. PATENT DOCUMENTS

| | | | |
|---|---|---|---|
| 5,159,547 A | 10/1992 | Chand | |
| 5,180,896 A | 1/1993 | Gibby et al. | |
| 5,272,621 A | 12/1993 | Aoki | |
| 5,283,729 A | 2/1994 | Lloyd | |
| 5,335,164 A | 8/1994 | Gough, Jr. et al. | |
| 5,394,322 A * | 2/1995 | Hansen | 700/37 |
| 5,453,925 A | 9/1995 | Wojsznis et al. | |
| 5,461,559 A | 10/1995 | Heyob et al. | |
| 5,568,378 A | 10/1996 | Wojsznis | |
| 5,587,899 A | 12/1996 | Ho et al. | |
| 5,625,552 A | 4/1997 | Mathur et al. | |
| 5,748,467 A | 5/1998 | Qin et al. | |
| 5,838,561 A * | 11/1998 | Owen | 700/32 |
| 5,966,679 A | 10/1999 | Snowbarger et al. | |
| 5,966,979 A | 10/1999 | Del Fabro et al. | |
| 5,992,229 A * | 11/1999 | Pyotsia et al. | 73/168 |
| 6,026,352 A * | 2/2000 | Burns et al. | 702/182 |
| 6,035,878 A | 3/2000 | Adams et al. | |
| 6,041,320 A | 3/2000 | Qin et al. | |
| 6,049,738 A | 4/2000 | Kayama et al. | |
| 6,192,321 B1 | 2/2001 | Grumstrup et al. | |
| 6,249,712 B1 | 6/2001 | Boiquaye | |
| 6,298,454 B1 * | 10/2001 | Schleiss et al. | 714/37 |
| 6,466,893 B1 * | 10/2002 | Latwesen et al. | 702/179 |
| 6,577,908 B1 | 6/2003 | Wojsznis et al. | |
| 6,594,589 B1 | 7/2003 | Coss, Jr. et al. | |
| 6,615,090 B1 * | 9/2003 | Blevins et al. | 700/26 |
| 6,647,312 B2 * | 11/2003 | Sasaki | 700/128 |
| 6,757,570 B1 * | 6/2004 | Calise et al. | 700/45 |
| 6,795,798 B2 * | 9/2004 | Eryurek et al. | 702/188 |
| 6,804,618 B2 * | 10/2004 | Junk | 702/77 |
| 6,813,532 B2 * | 11/2004 | Eryurek et al. | 700/108 |
| 6,826,521 B1 * | 11/2004 | Hess et al. | 703/12 |
| 6,941,244 B1 * | 9/2005 | Saito et al. | 702/183 |
| 7,024,336 B2 * | 4/2006 | Salsbury et al. | 702/182 |
| 7,206,646 B2 * | 4/2007 | Nixon et al. | 700/83 |
| 7,444,191 B2 | 10/2008 | Caldwell et al. | |
| 7,529,644 B2 * | 5/2009 | Lenz et al. | 702/183 |
| 7,627,441 B2 | 12/2009 | Longsdorf et al. | |
| 2004/0199332 A1 * | 10/2004 | Iliff | 702/19 |
| 2005/0197806 A1 * | 9/2005 | Eryurek et al. | 702/188 |
| 2005/0240364 A1 | 10/2005 | Friman | |

FOREIGN PATENT DOCUMENTS

| | | |
|---|---|---|
| JP | 2000-305620 | 11/2000 |
| JP | 2007-507712 | 3/2007 |
| SE | 530 380 C2 | 5/2008 |
| WO | WO-97/12300 | 4/1997 |
| WO | WO-99/15823 | 4/1999 |
| WO | WO-00/33209 | 6/2000 |
| WO | WO-2008/040728 | 4/2008 |

OTHER PUBLICATIONS

International Search Report and Written Opinion for International Application No. PCT/US2006/046589, dated Jun. 22, 2007.

Hägglund, Tore, "Automatic on-line estimation of backlash in control loops," *Journal of Process Control*, 17: 489-499 (2007).

Emerson Process Management, Control Valve Handbook, Fourth Edition, 297 pages, (2005).

Entech, "Control Valve Dynamic Specification," Version 3.0, 21 pages, (Nov. 1998).

John Gerry & Michael Ruel, "How to Measure and Combat Valve Stiction on Line," http://www.expertune.com/articles/isa2001/StictionMR.htm, 3 pages, (Sep. 2001).

Hägglund, Tore, "A Control-Loop Performance Monitor," Control Engine Practice, vol. 3, No. 11, pp. 1543-1551 (1995).

Horch, Alexander, "A Simple Method for Oscillation Diagnosis in Process Control Loops," S3-Process Control, Royal Institute of Technology, S-100 44 Stockholm, Sweden, pp. 1284-1289 (1999).

Kano et al., "Practical Model and Detection Algorithm for Valve Stiction," 6 pages.

Clare Shoene and S. Joe Qin, "Blind Identification for the Detection and Estimation of Valve Stiction." Department of Chemical Engineering, University of Texas, 10 pages.

Wojsznis, et al., "Adaptive Feedback/Feedfoward Pid Controller," Emerson Process Management, 8627 Mopac, Austin, Texas 78759, 11 pages.

Wojsznis, et al., "Utilizing DeltaV Adaptive Control," Emerson Exchange, Oct. 25-29, 2004, 83 pages.

He et al., "A Curve Fitting Method for Detecting Valve Stiction in Oscillatory Control Loops," 31 pages, (2005).

"Advanced Contol Unleashed: Plant Performance Managmeent for Optimum Benefit," Table of Contents, 6 pages.

Aström et al., "PID Controllers $2^{nd}$ Edition," 4 pages.

Blevins et al., "Process Monitoring Benefits from Fieldbus Architecture," 9 pages.

Choudhury et al., "Detection and Quantification of Control Valve Stiction," Dynamics and Control of Process Systems, *A Proceedings volume from the $7^{th}$ IFAC Symposium, Cambridge, Massachusetts, pp. 865-870*, Jul. 5-7 2004.

Choudhury et al., "A Simple Test to Confirm Control Valve Stiction," IFAC World Congress 2005, Jul. 4-9, Praha.

Kano et al., "Control Valve Stiction Detection and Control Performance Improvement by Using Plant Operation Data," Instrumentation Control Engineering, vol. 49, No. 2, pp. 27-31, Feb. 1, 2006.

Emerson Process Management, Key Technologies, (2 page web document), http://easydeltav.com/keytechnologies/index.asp, 1996-2006.

Notification of the First Office Action—Chinese Patent Application No. 200680045686.X dated May 12, 2010.

Patents Act 977 Examination Report under Section 8(3) dated Jul. 14, 2010.

Notification of the Second Office Action in Chinese Application No. 200680045686.X dated May 12, 2011.

Translation of Notification of the Third Office Action in Chinese Application No. 200680045686.X dated Mar. 23, 2012.

Notice of Reasons for Rejection in Japanese Application No. 2008-544487 dated Nov. 15, 2011.

Kano et al., "Practical Model and Detection Algorithm for Valve Stiction," IFAC Symposium on Dynamics and Control of Process Systems, 6 pages, 2004.

Clare Shoene and S. Joe Qin, "Blind Identification for the Detection and Estimation of Valve Stiction." Department of Chemical Engineering, University of Texas, Texas Wisconsin Modeling and Control Consortium Meeting, 10 pages, 2005.

Wojsznis, et al., "Adaptive Feedback/Feedforward PID Controller," Emerson Process Management, 8627 Mopac, Austin, Texas 78759, Instrument Society of America Technical Conference, 11 pages, 2003.

Blevins et al., "Advanced Control Unleashed: Plant Performance Management for Optimum Benefit," Table of Contents, Instrument Society of America, 6 pages, 2002.

Aström et al., "PID Controllers $2^{nd}$ Edition," Instrument Society of America, 4 pages, 2005.

Blevins et al., "Process Monitoring Benefits from Fieldbus Architecture," Instrument Society of America Technical Conference, 9 pages, 1999.

* cited by examiner

SELF-DIAGNOSTIC PROCESS CONTROL LOOP FOR A PROCESS PLANT

CROSS-REFERENCE TO RELATED APPLICATIONS

This patent claims priority from U.S. Provisional Application Ser. No. 60/742,320 which was filed on Dec. 5, 2005, the contents of which are expressly incorporated by reference herein in its entirety for all purposes.

FIELD OF THE TECHNOLOGY

The present disclosure relates generally to process control systems within process plants and, more particularly, to diagnostics for an adaptive process control loop in a process environment.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

Adaptive process control loops have been developed that adaptively designed self-tuning controllers for process control systems. Generally, adaptive process control loops are based on a model parameter interpolation. According to the model parameter interpolation, a candidate process model may be defined by a predetermined set of models. Each of the models may be characterized by a plurality of parameters and for each model, each of the parameters has a respective value that is selected from a set of predetermined initialization values corresponding to the parameter. The valuation of each of the models may include computation of a model squared error and computation of a Norm that is derived from the models square errors calculated for the models. The Norm value is assigned to every parameter value represented in the model that is represented in an evaluation scan. As repeated evaluations of models are conducted, an accumulated Norm is calculated for each parameter value. The accumulated Norm is the sum of all Norms that have been assigned to the parameter value in the course of model evaluations. Subsequently, an adaptive parameter value is calculated for each parameter of the process control loop. The adaptive parameter value may be a weighted average of the initialization values assigned to the respective parameters. The set of adaptive process parameter values are then used a redesigned the adaptive process control loop, and in particular the adaptive process control loop controller.

Process control loop performance measurements and diagnostics of possible causes of degradation in a process control loop is a common challenge for process control personnel. Generally, process control loop diagnostics involves a monitoring system that measures and presents information to an operator, such as variability of each variable in a process control loop, control block modes, process control loop input and output status, etc. The process control loop diagnostics help identify process control loops that are performing inadequately, process control loop having a bad mode and process control loops having a bad status. Accordingly, problematic process control loops can be identified, and the problems with such process control loops can be identified. However, identification of the causes of such problems generally requires separate diagnostic procedures.

In one example of a process control loop monitoring and diagnostic procedure, causes of process control loop oscillations are identified after detecting process control loop oscillations. Potential causes of process control loop oscillation are identified or categorized as external disturbances, such as a process control loop device problem (e.g., valve problem) or as a tuning problem. However, process control loop diagnostics often require significant manipulation of the process control loop. For example, a process control loop may require manipulation by switching the process control loop to manual or by changing the tuning of a process controller for the process control loop. Still further, process control loop diagnostics are often intended for execution under the supervision of a process control operator or other personnel.

Undesirable behavior of process control valves is often a significant contributor to poor process control loop performance and destabilization of a process operation. Valve diagnostics is often performed by process control loop special testing in a manual mode, and the test results are used for calculating valve resolution and dead band. More comprehensive diagnostic techniques involve measuring several valve parameters including backlash, dead time and response time. However, these diagnostic techniques require application of special test sequences and measurement of more valve operational parameters than are available in regular process control loops, including positioner pressure.

Several valve diagnostic techniques have been developed to detect valve resolution, dead band and hysteresis. One example of a technique for automatic valve diagnostics is based on developing a cross-correlation function of a process variable and process control loop controller output for a self-regulating process. A negative phase shift of the function indicates no stiction, while a positive phase shift indicates valve stiction.

In another example, an integrating process stiction is identified by applying a histogram shape of the second derivative of a process output value. A single histogram peak in the center indicates stiction, while two-sided peaks with a valley in the middle indicates no valve stiction. However, the results are qualitative and highly dependent on process control loop controller tuning.

Additional techniques estimate a percentage of time when valve position does not change while a process control loop controller output changes, utilize a plot shape of a process variable and controller output and/or utilize a curve fitting method for detecting valve stiction in oscillatory control loops. Stiction is indicated if the controller output curve for a self-regulating process or the process variable curve for an integrating process more closely corresponds to a triangular shape than a sinusoid shape. The curve shape is assessed by a stiction value. Stiction is considered absent in valve when the value is greater than or equal to zero and less than or equal to 0.4, considered undefined if the value is greater than 0.4 and less than 0.6, and considered present in the valve when the value is greater than or equal to 0.6 and less than or equal to 1. A further technique assumes a linear process model and a nonlinear valve model, and uses test data to identify both models. The identified valve model provides hysteresis of the valve, but without distinguishing between dead band and resolution.

Despite the advent of the above techniques, there is still a need for less complex techniques and for techniques which diagnose dead band and resolution. These demands motivated the authors setting the primary objectives of adding to the existing approaches a simple and practical diagnostic concept. Further, process control loop diagnostics is particularly important for adaptive process control loops. For example, adaptation of an adaptive process control loop may cause instability, which is not caused by improper adaptation, but rather by a process control loop device problem (e.g., a sticky valve) or a measurement failure. However, manual or semi-manual diagnostic procedures are not adequate for the adaptive process control loop, which often operate without supervision.

SUMMARY

A system and method is provided for self-diagnosing a process control loop, and particularly adaptive process control loops, while the process control loop is on-line. Each of the basic components of the process control loop (process control loop performance, process control loop device, adapted model quality and process control loop stability) are diagnosed asynchronously during normal process control loop operations. Diagnostic indices are generated for each component. Process control loop diagnostics utilize the diagnostic indices to evaluate a condition of the process control loop. As such, the process control loop diagnostics develop and utilize parameters indicating performance both of the complete process control loop and every process control loop device of the process control loop. In addition, the quality of the adapted process model is utilized as an indicator of the process control loop diagnostics.

The process control loop diagnostics is applicable for process control loop devices on different levels, including process control loop devices with feedback signals, such as back calculation signals, process control loop devices within adaptive process control loops, and process control loops without process models or feedback signals.

In an example, a valve diagnostic for an adaptive process control loop is provided. Valve resolution and dead band diagnosed during normal process control loop operation, rather than utilizing special testing procedures. The valve diagnostics are based on process model and utilizes the functionality of a model-based adaptive control. A further technique that does not use the process model is also developed for process control loops which provide a feedback signal, such as valve stem position to the process control loop controller as a calculation feedback.

DETAILED DESCRIPTION

Figure 1:
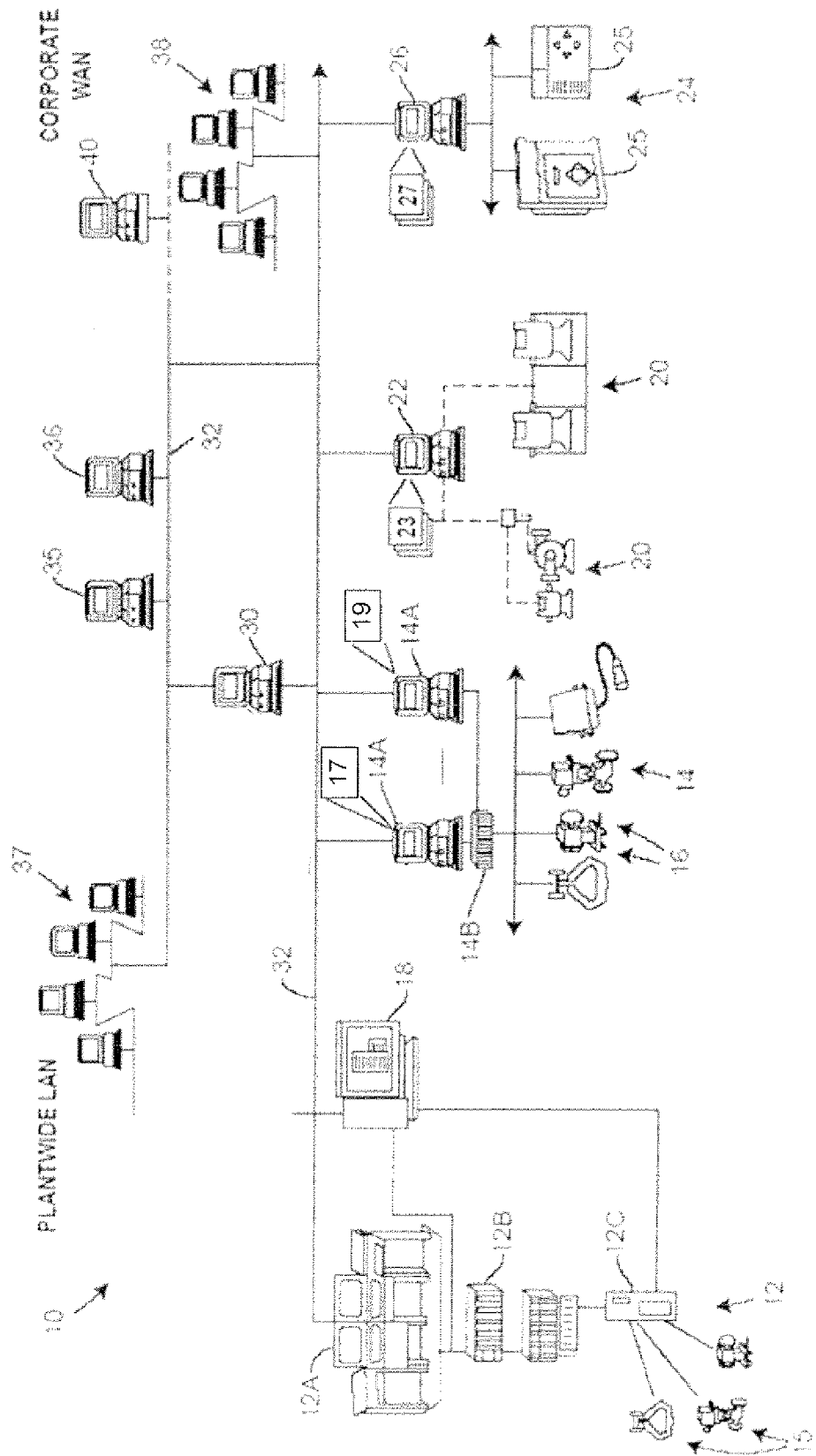
FIG. 1 is a schematic diagram of a process plant displaying an example of a hierarchical structure of equipment and instructions implemented in a process plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, such as DeltaV™, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices, including wireless connections and I/O devices, to one or more field devices 16, such as for example, HART® or Foundation Fieldbus™ field devices or any other smart or non-smart field devices including, for example, those that use any of the PROFIBUS®, WORLDFIP®, Device-Net®, AS-Interface® and CAN® protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the Asset Management System (AMS) application, such as AMS Device Manager sold by Fisher-Rosemount Systems, Inc., or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications 17, 19 such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example RBMware™ sold by CSi Systems of Knoxville, Tenn., AMS Machinery Manager sold by Fisher-Rosemount Systems, Inc. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications. As illustrated in FIG. 1, the computer 30 is also connected via the same or a different network bus 32 to business system computers and maintenance planning computers 35 and 36. The computer 30 may also be connected via, for example, the bus 32, to a plantwide LAN 37, a corporate WAN 38 as well as to a computer system 40 that enables remote monitoring of or communication with the plant 10 from remote locations. Alternatively, or in addition, the computer system 30 process control system 12, distributed process control system 14, maintenance interface 18, process control and/or maintenance interfaces 14A, rotating equipment maintenance computer 22, and/or the power generation and distribution computer 26 may be interconnected via an internet and communicate via an internet-compatible protocol. Accordingly, the plant 10 may be provided with viewing and control functions via one or more remote facilities which to view and control the various systems, computers and routines within the plant 10.

In addition, remote monitoring facilities may be communicatively coupled to the plant 10 via the internet to provide access to additional analysis and diagnostics resources. In one example, the plant 10 may be coupled to a failure defense planning system, which includes an analysis of the various plant assets and prioritizes the assets according to their importance to the plant or to systems within the plant to provide criticality data.

Figure 2:
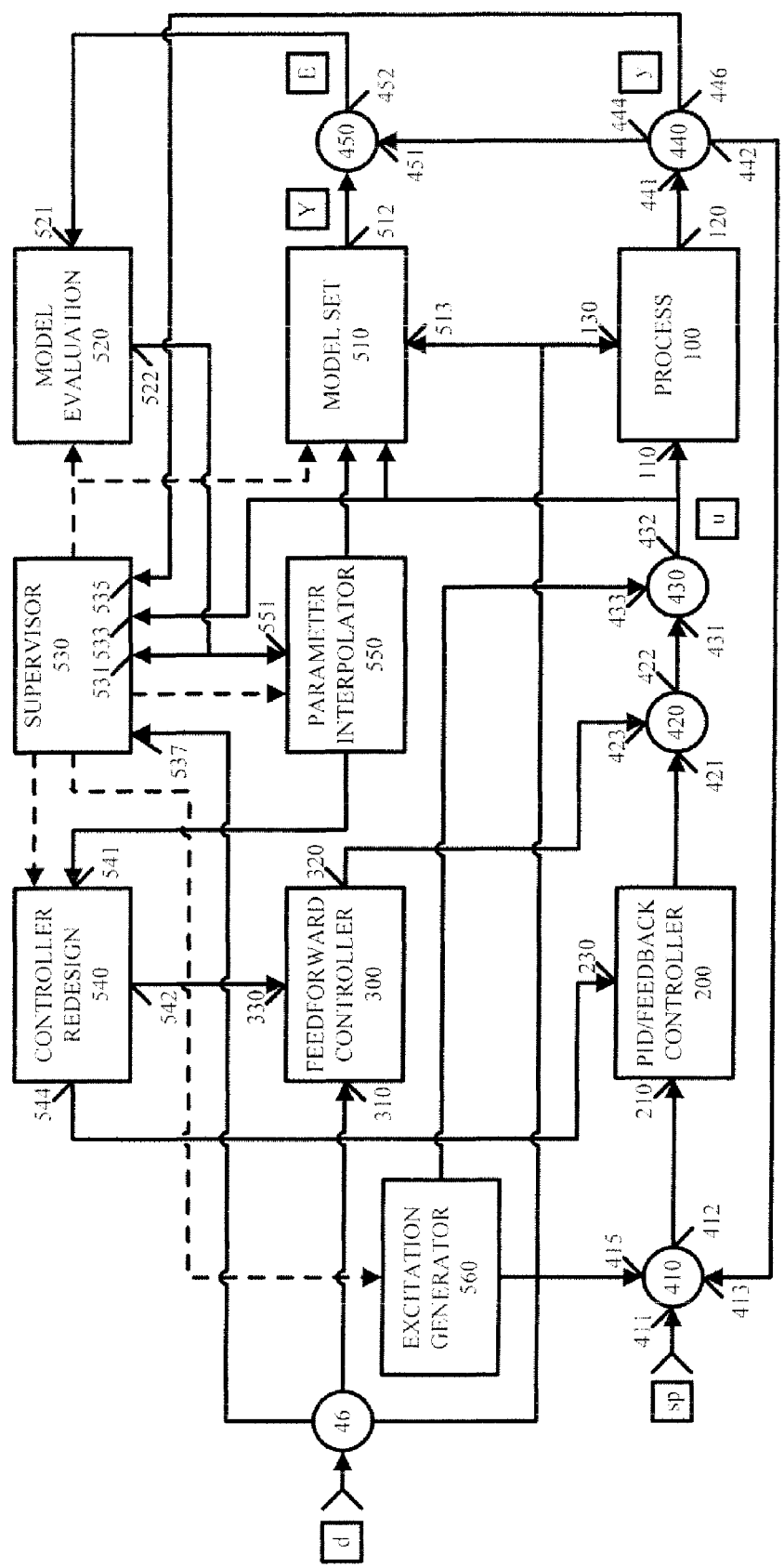
FIG. 2 is a schematic diagram of an example of an adaptive process control loop and process control loop controller based on interpolation of process model parameters.

Referring to FIG. 2, an example of an adaptive feedback/feedforward (FB/FC) PID controller used within an adaptive process control loop to control a process 100 is shown. As an example, the adaptive feedback/feedforward (FB/FC) PID controller of FIG. 2 may be used as the controllers 12B, 14B described above. Although the following describes an example of an adaptive feedback/feedforward (FB/FC) PID controller, a more detailed example of the controller may be found in U.S. Pat. No. 6,577,908 entitled "Adaptive Feedback/Feedforward PID Controller" filed on Jun. 20, 2000, the entire contents of which are expressly incorporated by reference herein.

The system may be described with reference to a feedback controller (FBC) input node 410, an FBC output node 420, a process input node 430, a process output node 440, a feedforward controller (FFC) input node 460, and an error node 450. A process setpoint signal, SP, is applied to a first input of the input node 410. The output 412 of the input node 410 is coupled to an input 210 of a PID controller 200. The output 220 of the PID controller 200 is coupled to a first input 421 of the FBC output node 420. The output 422 of the node 420 is coupled to a first input 431 of the process input node 430. An output 432 of the node 430 is coupled to a first input 110 of the process 100. An output 120 of the process 100 is coupled to an input 441, of the process output node 440. A first output 442 of the node 440 is fed back to a second input 413 of the input node 410. A second output 444 of the node 420 is coupled to a first input 451 of the error node 450. As seen in FIG. 2, the input signal to the process 100 is referred to as u(t), and the output signal of the process 100 is referred to as y(t). In addition, a disturbance signal, d, appears at an input of 461 of the FFC input node 460. The disturbance signal d is coupled from a first output 462 of the node 460 to an input 310 of FFC 300 and propagates from a second output 454 of the node 450 to the process 100.

A model set component 510 is shown in FIG. 2 to have signal inputs 511 and 513 respectively coupled to the disturbance signal d and to the process input signal u(t). The constituents of the model set component 510 are a set mathematical models of the process 100. An output 512 of the component 510 is coupled to an input 453 of the error node 450. An output 452 of the node 450 is coupled to an input 521 of a model evaluation component 520. The model evaluation component 520 includes a simulator that simulates the process 100, as defined by the process parameter values delivered by the model set component 510. An output 522 of the model evaluation component 520 is coupled to an input 551 of a parameter interpolator component 550 and to an input 531 of a supervisor component 530. An output 552 of the parameter interpolator 550 is coupled to an input 515 of the model set component 510, and an output 554 of the parameter interpolator 550 is coupled to the input 541 of a controller redesign component 540. The controller redesign component 540 has a first output 542 coupled to an input 230 of the FBC 200 and a second output 544 coupled to an input 330 of the FFC 300.

The process controlled by the adaptive feedback/feedforward PID controller is mathematically described by a model set 510. Each model in the model set 510 is defined by predetermined parameters, and each of the models is intended to replicate the process 100. In general, each of the models may be defined by a number of parameters, m, and each of the parameters may be assigned a number of values, n. The total number of models in the set 510 is equal to N, where $N=m^n$.

At, or prior to, the initiation of a model evaluation scan, the parameter interpolator 550 provides a set of predetermined initialization parameter values to the model set component 510. In general, the parameter values written to the model set 510 at the beginning of an adaptation cycle are based on the adaptive parameter values that were computed in the course of the most recent adaptation cycle. In the course of a model evaluation scan, the supervisor 530 will sequentially select and activate a model $Mod_j$. At that time the process input u(t) that appears at input 511 of the model set will be applied to the input of the activated model. The resultant output of $Mod_i$ will then appear at the model set output 512.

The output 512 of the model set 510 is coupled to an input 451 of the error generator node 450. The output signal of set 510 is identified in FIG. 2 by the variable Y. Concurrently, output, y, of the process 100 is coupled to a second input 453 of the error generator mode 450. The output 452 of the node 450, error signal E, is coupled to an input 521 of the model evaluation component 520. The error signal $E_i(t)$ is the difference between the process output y(t) and the output of model $Mod_i$ at time t. In one example, the model evaluation component 520 computes a model squared error corresponding to each model $Mod_i$ and assigns the model squared error to parameter values represented in the $Mod_i$. The output 522 of the model evaluator 520 is applied to the input 551 of the parameter interpolator 550. The parameter interpolator 550 calculates an adaptive parameter value for parameters represented in a model. The output 552 of the parameter interpolator 550 is coupled to the model set 510, and the output 553 of the parameter interpolator 550 is coupled to the input 541 of controller redesign component 540. The output 544 is applied to the PID controller 200 and the output 542 to the feedforward controller 300. The controller redesign component 540 imparts adaptive parameter values to the controllers upon conclusion of an adaptation cycle.

The supervisor component 530 has signal inputs 533, 535, 537 respectively coupled to the process input signal u, to the process output signal y, and to the disturbance signal d. The supervisor component 530 also has an input 534 coupled to the output of the model evaluation component 520. The supervisor 530 has a first control output 535 coupled to the model interpolator component 550, a second control output coupled to the models evaluation component 520, and a third control output coupled to the controller redesign component 540. The supervisor component 53 detects changes in the process output y, changes in the process input u from the PID controller 200, and changes in the disturbance (feedforward) input d. In the event that a change in the level of any of these signals exceed a predetermined minimum or threshold level, the supervisor 530 initiates an adaptation cycle. Model evaluation may include the following: (1) Model initiation and adjustment of model output to current process output; (2) incremental update of model based on specifications in the u and/or d signal; and (3) computation of model squared error.

Specifically, the process of adaptation of the feedback/feedforward PID is based on the application of interpolative techniques to model parameter values, which may be based on the concept of the model squared error technique. The model squared error technique defines a model squared error, $E_i(t)$, for each model in a scan. The model square error $E_i(t)$ is assigned to every parameter value of the model $Mod_i$, provided that the parameter value is represented in the evaluated $Mod_i$. Next, the $Mod_{i+1}$ is evaluated, and again the model squared error is computed for that model. As $E_i(t)$ is calculated during each model evaluation, and assigned to the parameter values represented in the respective models, an accumulated total of assigned model squared errors is maintained for each parameter value. The process continues, until all models, i=1, ..., N, are evaluated. A complete sequence, where each model $Mod_i$ is evaluated once, and a corresponding model squared error, $E_i(t)$, is calculated, is referred to as a model scan. As a result of this sequence of evaluations, or model scan, each parameter value has assigned a sum of squared errors from all models in which this specific parameter value has been used. As a result of this procedure, every parameter value $p^{kl}$ has assigned an accumulated value of the Norm:

$$Ep^{kl}(t) = \sum_{i=1}^{N} X_{kl} E_i(t) \qquad \text{(eq. 1)}$$

where:
$Ep^{kl}(t)$ is the Norm assigned to the parameters value $p^{kl}$ as a result of scan t
N is the total number of models, and
$X_{kl}=1$ if parameter value $p^{kl}$ is used in the $Mod_i$, and $X_{kl}=0$ if parameter value $p^{kl}$ is not used in the $Mod_i$.

The process is repeated in the next scan and the Norm that results from sum of the squared errors assigned during that scan is added to the Norm's computed during the prior scan(s). The set of successive performances of model scans is referred to as an adaptation cycle and continues, under control of the supervisor 530, until predetermined number of scans are completed, or until there have occurred an adequate number of excitations at the process input. As a result of this procedure, every parameter value $p^{kl}$ has assigned an accumulated value of the Norm determined during an adaptation cycle. The adaptive parameter value $p^k(a)$ is calculated for each parameter $p^k$ that is a weighted average of all values of the parameter. The adaptive parameter values define a new model set.

After comparing every model output with current process output, the tables of sum of squared errors is built. After adaptation cycle has been completed, an adaptive parameter value for every parameter is calculated. Once a model adaptation cycle has been completed, and adaptive parameter values established in accordance with the above, controller redesign is effected through the operation of controller redesign component 540. In essence, the controller redesign component simply maps the newly calculated, adaptive process parameter values to redesigned values for the parameters.

Figure 3:
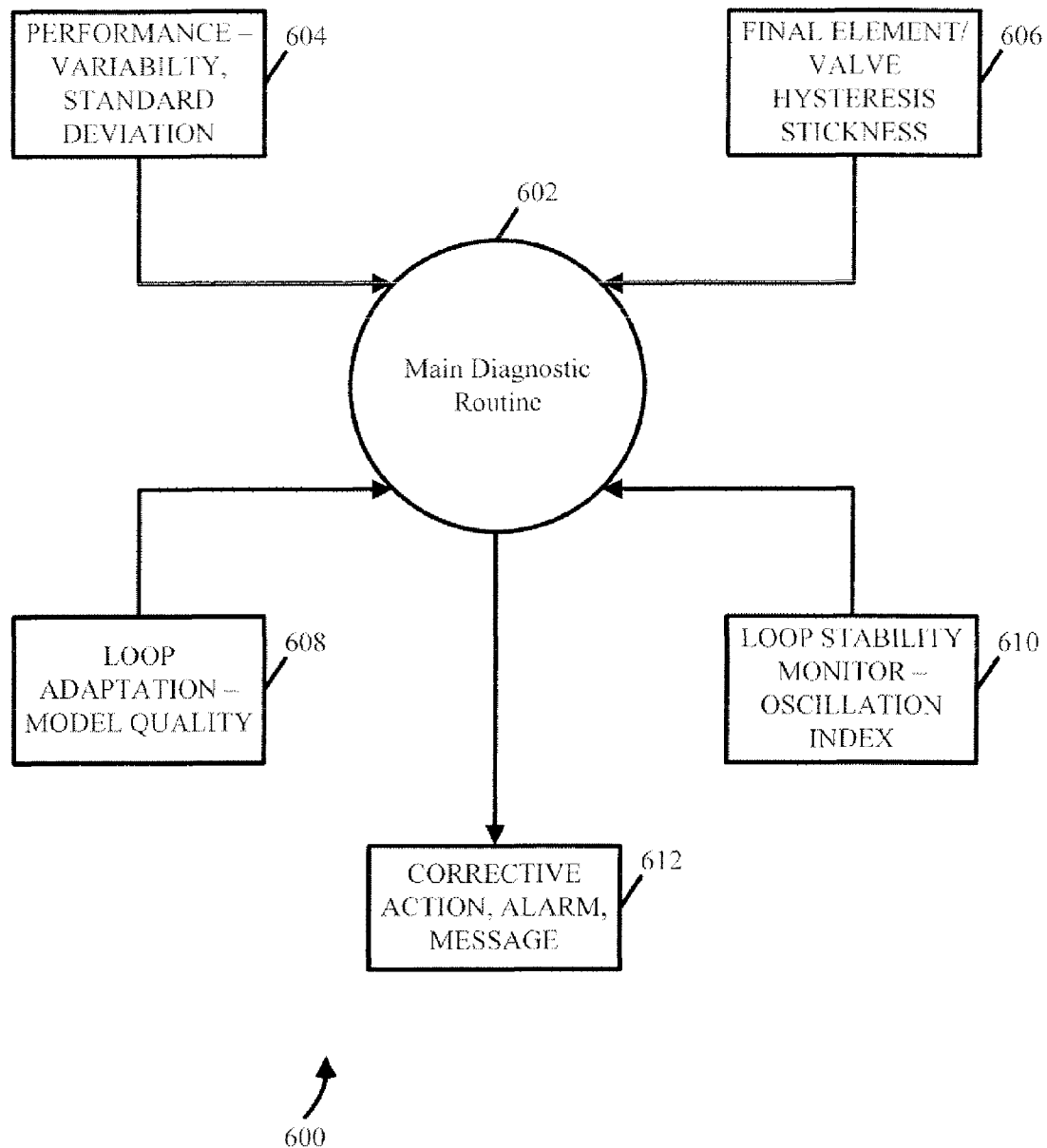
FIG. 3 is a block diagram of an example of a process control loop diagnostic system for a process control loop.

Referring to FIG. 3, an example of diagnostic system 600 for a process control loop, and particularly for an adaptive process control loop, is depicted. As a simplified example of an adaptive process control loop, reference is made herein to a control loop that includes a memory, a processor, and a plurality of process control devices, including a controller and a valve. However, it should be understood that process control loops may be much more complex and include dozens (or more) of devices therein. Further, although the examples below include reference to a value as a process control loop device, it should be understood that the concepts described in relation thereto may be applied to other devices in a process control loop, including, but not limited to, field devices 15, 16, rotating equipment 20, power generating and distribution equipment 25, etc. Although the following describes the diagnostic system 600 as being implemented within the adaptive process control loop, it should be understood that the diagnostic system 600, or particular elements thereof, may also be implemented outside of the adaptive process control loop.

The diagnostic system 600 includes a main diagnostic component 602, which may be implemented as a software routine stored in a memory and executed by a processor, such as the memory and processor of the process control loop. While the process control loop is on-line, process control loop signal data is generated and measured. The measured process control loop data may be collected from any or all process control loop devices within the process control loop, including valves, controllers, sensors thereof etc. The measured process control loop data may also be collected from the adapted models and components of the adaptive process control loop controller, such as the model evaluation component 520. In addition, measure process control loop data related to the process control loop as a whole may be collected, such as oscillation measurements. As a result, the measured process control signal data is the result of the normal operation of the process control loop, as opposed to data resulting from an exogenous signal which may otherwise disrupt the normal operation of the process control loop, data generated as a result of manual control of the process control loop, etc.

The main diagnostic component 602 receives diagnostic indices from several diagnostic tools for the adaptive process control loop to evaluate a condition of the process control loop while the process control loop is on-line. Each of the diagnostic tools make use of readily available parameters developed during normal loop operation. Examples of diagnostic tools for a process control loop include a process control loop performance tool 604, a process control loop device tool 606, an adapted model quality tool 608 and a process control loop stability tool 610, each of which utilize process control loop signal data, such as measurement data, position data, process control signal data, adapted model data, feedback data and the like to generate the diagnostic indices. Examples of process control loop signal data are provided below with reference to corresponding diagnostic tools that utilize the process control loop signal data to generate respective diagnostic indices.

Each diagnostic tool may generate a different diagnostic index. Each diagnostic index may correspond to a different process control loop component, such as a process control loop performance and status component, a process control loop device component, an adaptive model quality component and a process control loop stability component. For example, a performance index may be generated by the process control loop performance tool 604 for the process control loop performance and status component, a process control loop device diagnostic index may be generated by the process control loop device tool 606 for the process control loop device component, a model quality index may be generated by the adapted model quality tool 608 for the adapted model quality component, and a process control loop stability index may be generated by the process control loop stability tool 610 for the process control loop stability component. It should be understood that other measurement and diagnostics tools for the process control loop and devices therein may also be utilized to generate diagnostic indices for use by the main diagnostic component 602. each of the components may be diagnosed by the respective diagnostics tools 602, 604, 606, 608 asynchronously during the normal operation of the process control loop while the process control loop is on-line. For example, an index generation routine is described in U.S. Pat. No. 6,813,532 entitled "Creation and Display of Indices Within a Process Plant" filed on Feb. 28, 2002, the entire contents of which are expressly incorporated by reference herein.

The main diagnostic component 602 utilizes the diagnostic indices from one or more of the diagnostic tools. As such, each process control loop component may be accounted for in the diagnostics of the process control loop, and the main diagnostic component 602 evaluates the condition of the process control loop while making use of readily available parameters developed during normal process control loop operation. In particular, by defining and calculating individual diagnostic indices for each process control loop component, process control loop diagnostics are transparent and effective. Individual and distributed diagnostic tools operating, asynchronously and independently allow for gradual implementation and partial operation of the overall process control loop diagnostic function. Further, because each diagnostic index is generated asynchronously for each process control loop component, the main diagnostic component 602 is capable of identifying the causes of poor loop performance.

In addition to the diagnostic tools, 604, 606, 608, 610, a reporting tool 612 is provided which initiates and/or executes a function in response to the main diagnostic routine 602. Examples of functions that may be generated based upon an evaluated condition of the process controller, include, but are not limited to, alarms, messages, and corrective actions.

As mentioned above, one of the diagnostic indices that may be generated is a process control loop performance index. The process control loop performance index may provide an indication of the performance of the complete process control loop. The process controller performance index may be expressed as a variability index or a total process variable standard deviation, each of which indicate performance of the process control loop. A capability standard deviation may also be useful to reflect noise in the process control loop.

A variability index may indicate a process control loop tuning condition and or a process control loop device condition, such as the condition of a valve. As an example, a variability index may be defined as a percentage by the following calculation:

$$VI = 100\left(1 - \frac{S_{lq} + s}{S_{tot} + s}\right)\% \quad \text{(eq. 2)}$$

$S_{lq}$ is a minimum standard deviation, such as a minimum standard deviation achievable with feedback control (e.g., feedback signals provided from a device to a process control loop controller to improve process control), $S_{101}$ is an actual measured standard deviation, and s=a sensitivity factor, to stabilize calculations. The sensitivity factor s, may be defined by a default value of 0.1% of the variable scale. The actual measure standard deviation is also the total standard deviation and may also indicate a process control loop tuning condition and or a process control loop device condition, such as the condition of a valve.

The minimum standard deviation, $S_{lq}$, achievable with feedback control may be defined by the following, calculation:

$$S_{lq} = S_{cap}\sqrt{2 - \left[\frac{S_{cap}}{S_{tot}}\right]^2} \quad \text{(eq. 3)}$$

$S_{cap}$ is an estimated capability standard deviation (i.e., standard deviation at a process ideal operation—primary higher frequency process changes). Capability standard deviation is indicative of noise or higher frequency disturbances.

The variability index, the total standard deviation or the capability standard deviation may be used for process control loop self-adjustment of process variable (PV) filters in the loop. Because noise may affect model identification during adaptation, and in particular when controller derivative action is present, process variable filtering, may improve model identification. As such, the process variable filtering may be applied for data used for model identification for an adaptive process control loop and/or for control of a process control loop.

A process control loop device diagnostic index may indicate a diagnostic of a device, such as a condition of a valve, in the process control loop. Process control loop device diagnostic indices may include indices for resolution, dead band and hysteresis of a process control loop device. Resolution of a process control loop device refers to a measure of a minimum process control signal require to generate a response from the process control device. Dead band of a process control loop device refers to a measure of the range through which an input can be varied without initiating an observable response in a process control loop device in response to a process control signal. Hysteresis refers to a displacement of a process control loop device based on an input to the process control loop device and an output, such as a feedback signal, from the process control loop device indicating the response to the input.

Figure 4:
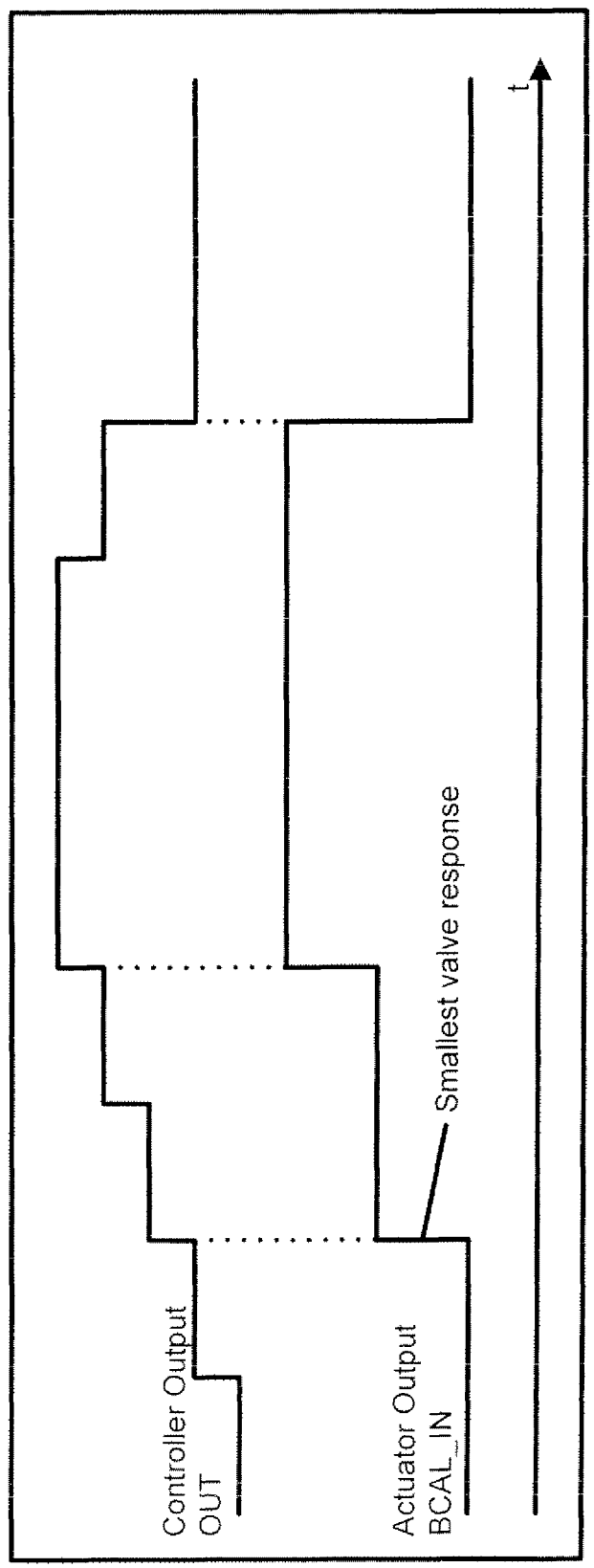
FIG. 4 is a chart depicting an example of a process control loop device demonstrating resolution of the process control loop device in response to a process control loop controller output.
Figure 5:
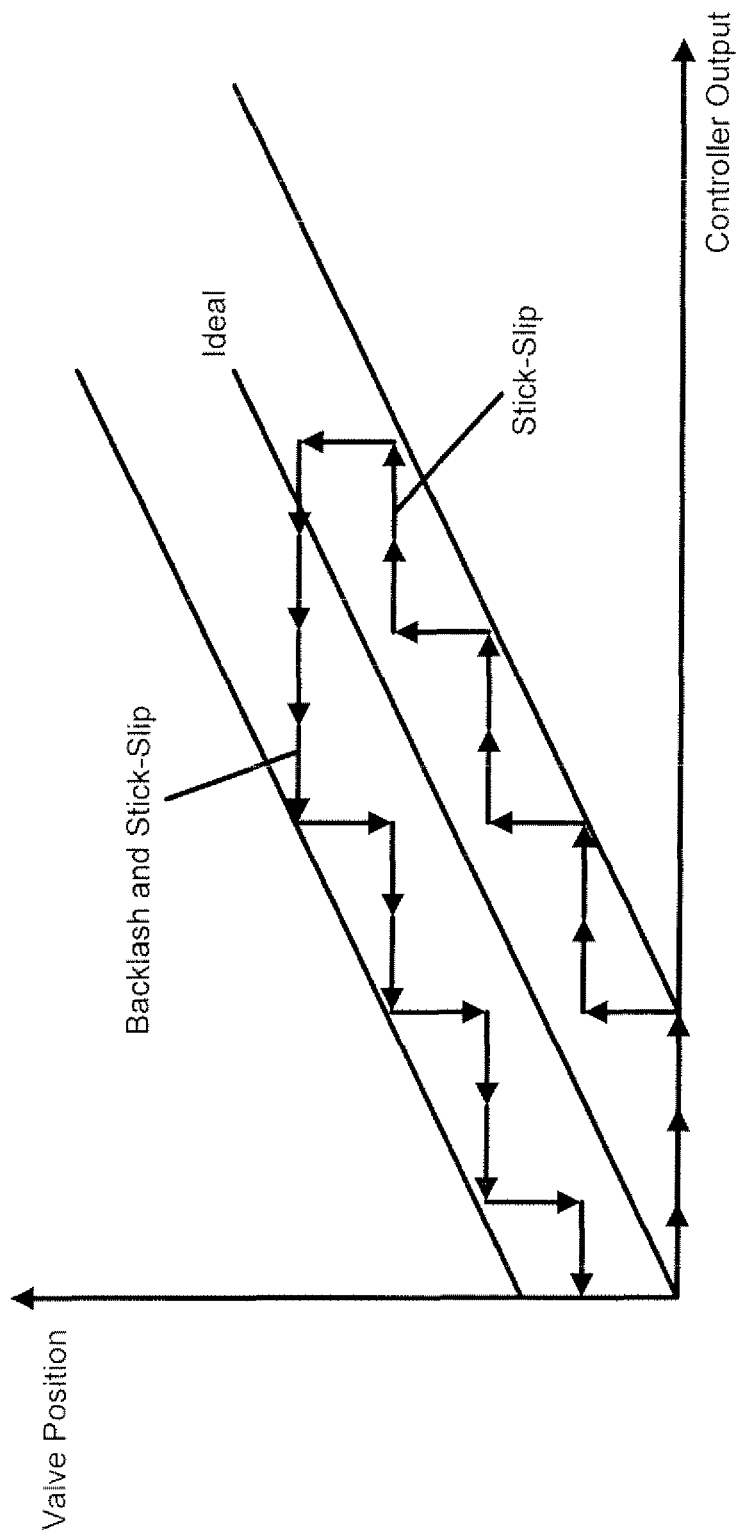
FIG. 5 is a chart depicting an example of a process control loop device demonstrating resolution and dead band of the process control loop device in response to a process control loop controller output.

As an example, valve diagnostics provides indices for resolution (sometimes referred to as stickness, stick-slip or stiction which are effects of resolution), dead band (sometimes referred to as backlash) and hysteresis. The indices may be calculated in the process control loop using the output of a process control loop controller, OUT, and a feedback signal from the final element indicating valve position, BKCAL_IN. An example of valve operation demonstrating resolution and dead band is depicted in FIG. 4. Referring to FIG. 4, valve resolution is the minimum process controller output step change that causes valve movement. Valve dead band manifests itself as lost movement when the direction of movement of the actuator changes. As shown in FIG. 5, resolution and dead band effectively cause a significant change of the actuator characteristic.

One example of estimating resolution online is by calculating the difference between the process control loop controller output, OUT, and the process control loop device response (e.g., actuator/valve position) for every evaluation scan. In particular, the difference may be defined by a back calculation signal, BKCAL_IN, provided by the process control loop device:

$$\Delta_i(t) = |OUT(t-i) - BKCAL\_IN(t)| \quad \text{(eq. 4)}$$

The selection of the highest values of $\Delta_i(t)$ averaged over a certain period of time may be considered as the actuator dead band and resolution estimate. Hysteresis may be calculated as a function of resolution and dead band, and further as a function of the selected maximum values:

$$h = b + \delta = \text{avg}(\max \Delta_i) \quad \text{(eq. 5)}$$

where b is the process control loop device (e.g. valve) dead band, $\delta$ is the process control loop device resolution, max $\Delta i$ is a maximum value of a back calculation signal, and i is the back calculation signal delay in module scans of the adaptive process control loop, where the module is a software functional unit defining loop control. As an example, the back calculation signal delay, i, may account for the valve speed of the response (e.g., velocity limit).

The duration of one cycle of the calculation of the difference, $\Delta_i$, between the process control loop controller output and the back calculation signal can be several oscillation periods. An estimate of the calculation cycle could be approximately a few hundred PID controller integral times. The dead band can be calculated directly from equation 5, while further accounting for the effect of process control loop controller output change on the process control loop device output change after a predefined number of evaluation scans. In other words, if:

$$|\Delta OUT(t-i) * \Delta BKCAL\_IN(t)| > 0 \quad \text{(eq. 6)}$$

then $$b = \text{avg}(\max \Delta_i) \quad \text{(eq. 7)}$$

where:

$$\Delta OUT(t-i) = OUT(t-i) - OUT(t-i-1) \quad \text{(eq. 8)}$$

$$\Delta BKCAL\_IN(t) = BKCAL\_IN(t) - BKCAL\_IN(t-1) \quad \text{(eq. 9)}.$$

OUT(t−i) is a process control signal from the process control loop controller to the process control loop device, such as a valve, and BKCAL_IN(t) is a back calculation signal from the process control loop device in response thereto.

The resolution of the process control loop device may then be found as:

$$\delta = h - b \quad \text{(eq. 10)}.$$

The above example accounts for process control loop devices that provide a back calculation signal. Generally, the above approach using a back calculation signal provide a greater degree of simplicity and accuracy than other approaches. However, for process control loop devices that do not provide a back calculation signal, such as valve diagnostics for the actuators which do not provide a back calculation signal, resolution, dead band and hysteresis may still be determined. An example of a procedure for robust identification of resolution, dead band and hysteresis which still provides sufficient accuracy includes defining the oscillation amplitude on the process control loop controller input, Ampl(PV) and defining the oscillation amplitude on the process control loop controller output, Ampl(OUT). The hysteresis may then be calculated as:

$$h = 2\text{Ampl}(OUT) \quad \text{(eq. 11)}$$

If the process control loop gain, $K_p$, is known, the resolution of a process control loop device, such as valve resolution, may be calculated as:

$$\delta = \frac{2Ampl(PV)}{K_p} \quad \text{(eq. 12)}$$

Based upon equation 10, the dead band of a process control loop device, such as a valve dead band, may be calculated as:

$$b = h - \delta \quad \text{(eq. 13)}$$

For both the process control loop controller input and output, the oscillation amplitude is defined as half of the difference between signal maximum and minimum values, which can be directly detected. Alternatively, the oscillation amplitudes may be found by integrating samples over a given time interval, and then calculating an average sample area relative to the mean value over one oscillation. Assuming a sawtooth (e.g. triangular) shape for the process control loop controller output and a step- or rectangular-like shape for the process variable (PV), the oscillation amplitude may be calculated from the sample area.

The above example accounts for situations where the process control loop gain, $K_p$, is known, which is particularly applicable to adaptive process control. However, if process control loop gain is unknown, an approximate heuristic formula may be applied. In particular, the resolution from the period of oscillation may be calculated from the following:

$$T_{osc} = 5T_i\left(1 + \frac{1}{\sqrt{K_c}}\right)Ae^{\frac{-B\delta}{\delta+B}} \quad \text{(eq. 14)}$$

where A and B are heuristic parameter values estimated for a self-regulating process, $T_i$ is a process control loop controller reset time, and $K_c$ is a process control loop controller gain. A is greater than B, with A approximately equal to 6 and B approximately equal to 2.5. Defining hysteresis from the process control loop controller output and using known process control loop controller gain, $K_c$, and reset, $T_i$, it is possible to estimate the resolution, $\delta$, from equation 14.

A number of valve diagnostic techniques have been developed, which calculate various kind of indexes providing indirect, qualitative rather than quantitative information about resolution and dead band, in which qualitative information may be useful in diagnostics for adaptive process control loops, whereas quantitative information may not be useful or as useful in diagnostics for adaptive process control loops.

The following provides a valve diagnostic concept suitable for process control loops with model-based adaptation. The valve diagnostics are developed on three levels: 1) diagnostics for valves with available back calculated valve position; 2) diagnostics for the valves working in process control loops with an adapted process model; and 3) valve diagnostics in a process control loop without an adapted process model and without a back calculated valve position.

Two main valve diagnostic parameters which identify valve conditions are valve resolution and valve dead band. As indicated above, resolution is a minimum change in input required to produce a detectable change in the output when no reversal of the input takes place. Referring again to FIG. 4, a valve operation demonstrates resolution expressed as a percent of the input span.

Referring again to FIG. 5, valve resolution degradation is caused by increased friction observed as stiction, stick-slip or stickness. FIG. 5 also illustrates valve dead band. As mentioned above, dead band may be referred to as a range through which a valve input signal can be varied, upon reversal of direction, without initiating an observable change in the valve position. In a valve, dead band may manifest itself as a lost movement when the direction of movement of the actuator changes. Resolution and dead band effectively cause in a significant change of the actuator characteristic, as shown in FIG. 5. The combined effect of dead band and resolution produces displacement or hysteresis in valve input-output plot.

An automated valve diagnosis accommodates the feedback signal from the final element indicating valve position, BKCAL_IN, which allows for calculation of dead band and resolution within a PID block. In particular, the difference between the previous process control loop controller output, OUT(t−i), and the feedback signal, BKCAL_IN(t), where i=1 for a typical case but not always, is exploited for the process control loop.

Figure 6:
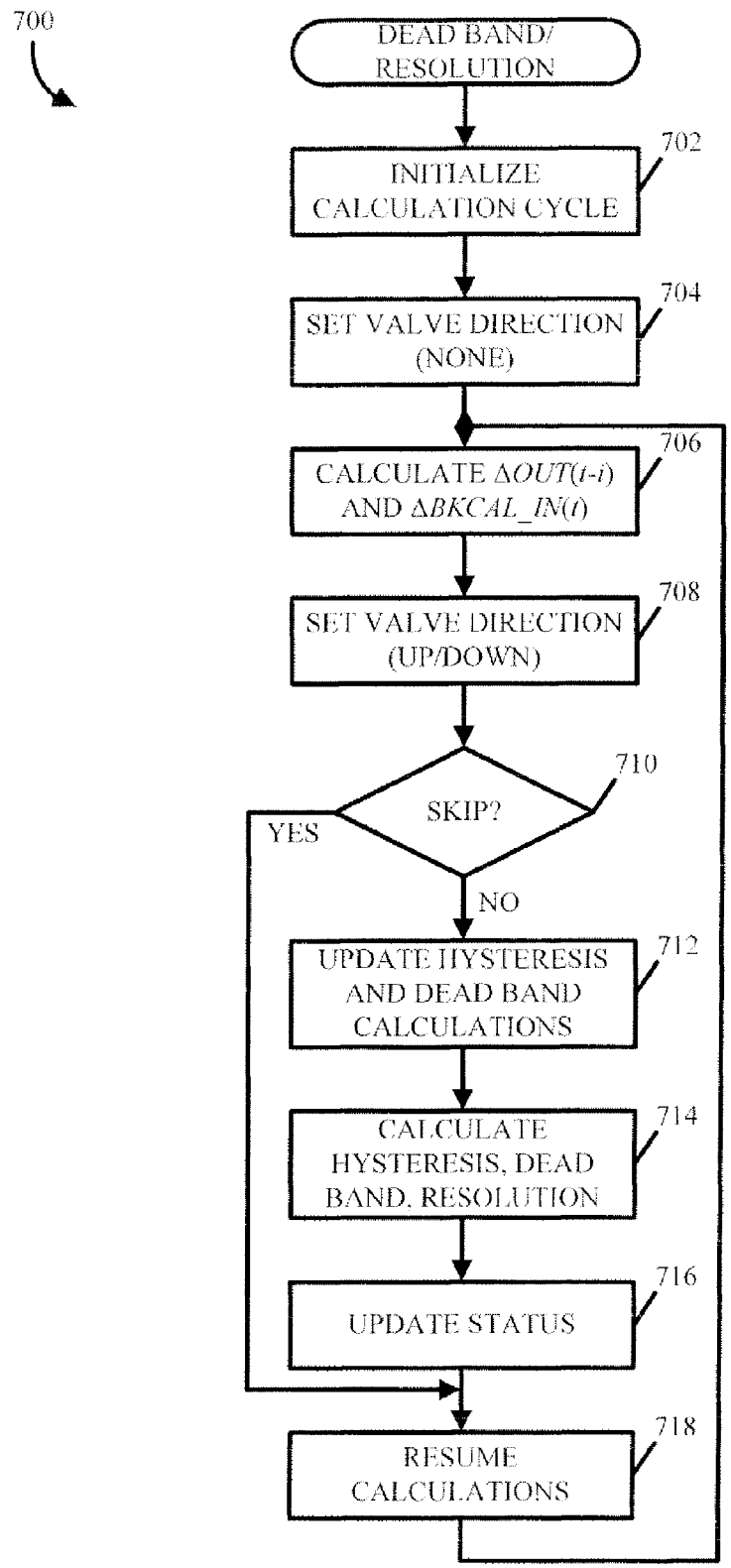
FIG. 6 is a flow chart of an example of a routine which may be executed as part of a valve diagnostic to determine dead band, resolution and hysteresis.

Referring to FIG. 6, an example of a routine 700 to calculate valve hysteresis, resolution and dead band based upon the exploitation of the difference between process control loop controller output and the feedback signal (e.g., back calculation signal) is shown. Beginning at block 702, the routine initializes the calculation cycle, and set the calculation cycle time, $T_{calc}$. For example, the calculation cycle time, $T_{calc}$, may be approximately equal to 30 times the time to steady state, $T_{ss}$, for a controlled process (i.e., $T_{calc} \approx 30T_{ss}$). The time to steady state, $T_{ss}$, may be calculated as:

$$T_{ss} = 3\tau_c + \tau_d \quad \text{(eq. 15)}$$

where $\tau_c$ is the process dominant time constant, and $\tau_d$ is the process dead time. As an alternative example, the calculation cycle time, $T_{calc}$, may be approximately equal to 100 times the process control loop controller integral time, $T_i$, (i.e., $T_{calc} \approx 100T_i$).

At block 704, the valve direction is set to NONE for initialization. The functions of blocks 706, 708 and 710 are then performed for each model evaluation scan in the adaptive process control loop. In particular, at block 706 the change in control loop controller output, OUT(t−i), and the change in the feedback signal, BKCAL_IN(t), where i is set to 1 as a default value (but is otherwise adjustable), are calculated according to equations 8 and 9 above.

At block 708, the valve direction is set based upon the difference between the control loop controller output and the feedback signal. For example, the valve direction is set to UP if:

$$OUT(t-i) - BKCAL\_IN(t) > 0 \quad \text{(eq. 16)}$$

and the valve direction is set to DOWN if:

$$OUT(t-i) - BKCAL\_IN(t) < 0 \quad \text{(eq. 17)}.$$

If neither equation 16 nor 17 is true, then the previous direction of the valve is retained.

At block 710, the rest of the calculations for the model evaluation scan are skipped if:

$$|\Delta OUT(t-i)| < \zeta \quad \text{(eq. 18)}$$

or $$|\Delta BKCAL\_IN(t-i)| < \zeta \quad \text{(eq. 19)}.$$

where $\zeta$ may be set to 3% as a default value. As a further condition, the rest of the calculations for the model evaluation scan may be skipped if the valve direction is set to NONE.

If the calculations are not skipped, at block 712 the hysteresis and dead band calculations for the valve are updated. In particular, if the valve direction is set to UP and if:

$$\Delta OUT(t-i) \geq 0 \quad (eq. 20)$$

then "hysteresis up", $\Delta h^+$, is calculated when the controller output, OUT, opens the valve (i.e., OUT>BKCAL_IN). The "hysteresis up", $\Delta h^+$, may be calculated as:

$$\Delta h_i^+(t) = |OUT(t-i) - BKCAL\_IN(t)| \quad (eq. 21)$$

and $$\Delta h^+ = \max\{\Delta h_i^+(t)\} \quad (eq. 22)$$

is the maximum value of j calculations.

Further, if the valve direction is set to UP and equation 20 is true, and if:

$$|\Delta OUT(t-i) * \Delta BKCAL\_IN(t)| > 0 \quad (eq. 23)$$

then "dead band up", $\Delta b^+$ is calculated as:

$$\Delta b_j^+(t) = \Delta h_j^+(t) \quad (eq. 24)$$

and $$\Delta b^+ = \max\{\Delta b_j^+(t)\} \quad (eq. 25)$$

is the maximum value of j calculations.

Alternatively, if the valve direction is set to DOWN and if:

$$\Delta OUT(t-i) \leq 0 \quad (eq. 26)$$

then "hysteresis down", $\Delta h^-$, is calculated when the controller output, OUT, closes the valve (i.e., OUT<BKCAL_IN). The "hysteresis down", $\Delta h^-$, may be calculated as:

$$\Delta h_j^-(t) = |OUT(t-i) - BKCAL\_IN(t)| \quad (eq. 27)$$

and $$\Delta h^- = \max\{\Delta h_j^-(t)\} \quad (eq. 28)$$

is the maximum value of j calculations.

Further, if the valve direction is set to DOWN and equation 26 is true, and if:

$$|\Delta OUT(t-i) * \Delta BKCAL\_IN(t)| > 0 \quad (eq. 29)$$

the "dead band down", $\Delta b^-$ is calculated as:

$$\Delta b_j^-(t) = \Delta h_j^-(t) \quad (eq. 30)$$

and $$\Delta b^- = \max\{\Delta b_j^-(t)\} \quad (eq. 31)$$

is the maximum value of j calculations.

After the calculation cycle time, $T_{calc}$, the hysteresis, h, dead band, b, and resolution, $\delta$, may be calculated at block 714 as follows:

$$h = \Delta h^+ + \Delta h^- \quad (eq. 32)$$

$$b = \Delta b^+ + \Delta b^- \quad (eq. 33)$$

$$\delta = h - b \quad (eq. 34)$$

At block 716, the status is updated (or set). For example, if the results are ZEROS and the previous results are non-zeros, the valve diagnostics status is set to UNCERTAIN. If resolution is negative, the valve diagnostic status is set to BAD, and if the resolution is not negative, the valve diagnostics status is set to GOOD. At block 718, the routine 100 resumes with a new calculation cycle.

As disclosed above, resolution, dead band and hysteresis may also be determined for process control loop devices that do not provide a back calculation signal. For example, the valve diagnostics for actuators with no back calculation signal is based on the process model and the best suited model for the adaptive control loops or automatically tuned loops. As above, the oscillation amplitude on the process controller input signal from the process variable PV, Ampl(PV) and the oscillation amplitude on the process control loop controller output OUT, Ampl(OUT) are defined, and the hysteresis is calculated according to equation 11. In the following example, the oscillation shape defined by a shape factor is used for identifying oscilliations caused by the valve. Noise is accounted for by the following:

$$h = h - \gamma * Ampl(Noise) * Gain \quad (eq. 35)$$

where $\gamma < 2$, and Gain is the process control loop controller proportional gain. The oscillation shape is accounted for by applying a shape factor:

$$h = h(\alpha + factor(Shape)) \quad (eq. 36)$$

where $0 \leq factor(Shape) \leq 1 - \alpha$ and the shape factor is defined from the process variable, PV, and controller output, OUT, oscillation shape coefficients. The shape coefficient for an oscillatory signal, PV, OUT or o(k), is:

$$\text{shape } (oscil) = \frac{Ampl(oscil)}{Avg(oscil)} \quad (eq. 37)$$

where oscil=o(k)=OUT or PV.

For a typical shape, such as a sawtooth oscillations shape, the coefficient is 2. For a sine wave oscillations shape the coefficient is $\pi/2$. As explained above, oscillation amplitude is defined as a half of difference between signal maximum and minimum values over calculation cycle. The average value of the oscillations harmonics is:

$$Avg(oscil) = \sum_{k=1}^{n} \frac{|o(k) - \bar{o}|}{n} \quad (eq. 38)$$

where the means value of the oscillation signal, $\bar{o}$, is:

$$\bar{o} = \frac{\sum_{k=1}^{n} o(k)}{n}. \quad (eq. 39)$$

For a self-regulating process, factor(Shape)=Scale(shape (OUT)-shape(PV). For an integrating process, factori=-factor(Shape). The shape factor, factor(Shape), is a difference between shape coefficient for the output oscillations and the shape coefficient for the process variable oscillations. The shape factor may be scaled to have a minimum value 0 and a maximum value of $1-\alpha$. The maximum value occurs when there are saw tooth signals typical oscillations caused by the valve dead band and resolution with relatively small noise. The minimum, close to a zero value of the shape factor, is when PV and OUT signals have similar or close to random signal shapes, which may occur when resolution and dead band are comparable with the noise level.

Resolution, $\delta$, and dead band, b, may be calculated according to equations 12 and 13, respectively. After accounting for the noise and oscillation shape, resolution may be calculated as:

$$r = \frac{2(Ampl(PV) - Ampl(\text{Noise}))(\alpha + \text{factor (Shape)})}{K_p}. \quad \text{(eq. 40)}$$

However, as above, if process gain, $K_p$, is not available, resolution can be estimated by using controller gain, Gain:

$$r = 2(Ampl(PV) - Ampl(\text{Noise}))(\alpha + \text{factor}(\text{Shape}))* \text{Gain} \quad \text{(eq. 41)}$$

The calculation cycle period for model based diagnostics is approximately the same as for the diagnostics with back calculated valve position. Filtering or averaging may be used to achieve stable results. While this may slow down the diagnostics, the limitation may not be significant, because the diagnostic is performed continuously on-line.

The valve resolution and dead band diagnostic calculation has been implemented in the adaptive PID function block, being part of an industrial DCS structure. The DCS allows easy and flexible simulations of linear and non-linear process dynamics. The valve model as in the appendix was used with the second order plus dead time controlled process. The model recreates valve steady state characteristics and dynamic response.

As an example of the above valve diagnostics a valve with stem position feedback was tested for the following ranges of the parameters illustrated in Table 1.

TABLE 1

| Resolution [%] | 0.02 | 0.1 | 0.25 | 0.25 | 0.5 | 0.5 | 1.0 | 1.0 | 2.0 | 2.0 |
|---|---|---|---|---|---|---|---|---|---|---|
| Dead band [%] | 0.05 | 0.25 | 0.5 | 1.0 | 1.0 | 2.0 | 2.0 | 5.0 | 5.0 | 10.0 |

The applied random noise was 0.25% for resolution up to 0.5%. The applied random noise for larger resolutions additionally was 0.5% and 1.00%. The diagnostic results were exact up to two decimal places for all cases, except of intermittent calculation cycles. The results were not affected by the noise.

Valve resolution and dead band diagnostics with an applied process model and with no stem position feedback were tested in the same loop, though an adaptive process model was used for diagnostics. Representative test results are shown in Table 2.

TABLE 2

| Resolution % (True/Diag.) | 0.1/0.13 | 0.2/0.19 | 0.5/0.41 | 0.5/0.39 | 1/0.93 | 2/1.72 | 2/1.76 |
|---|---|---|---|---|---|---|---|
| Dead band % (True/Diag.) | 0.3/0.32 | 0.5/0.45 | 1/1.12 | 2/1.69 | 2/2.20 | 5/5.70 | 10/10.49 |

The applied random noise level was as in the previous tests. The diagnosed resolution and dead band accuracy were dependent on the adaptive process model. However, diagnosed valve hysterysis was not affected by the adapted model, but rather by the process noise and disturbances. A smaller model versus real process gain, contributed to the higher than real diagnosed resolution. Similarly, a higher process model gain contributed to the smaller diagnosed valve resolution.

A model quality index may indicate the quality of the adapted model for the process control loop, where the adapted model is defined during an adaptation cycle for the process control loop, an example of which was provided above. Model quality may be calculated in various ways. In one example, model quality is defined during model identification (e.g., during a model evaluation scan). A poor model quality indicates a loop condition problem which may include valve, measurement noise, tuning or an improper setup for the adaptation. Model validation may be performed by comparing a final model output with the real process variable, PV. The squared error per evaluation scan is an attribute for the process control loop block. The following criteria for model acceptance applied after data has been collected for the adaptation:

$$SqError(k) = \frac{TotalSqError}{NumberofSamples} \quad \text{(eq. 42)}$$

where:

$$\frac{SqError(k)}{SqError(k-1)} < R \quad \text{(eq. 43)}$$

$$SqError(k) < e_{max}. \quad \text{(eq. 44)}$$

The squared error, SqError(k), is the error from a previous adaptation cycle of the process control loop, adaptive controller block attribute, $E_{max}$ is the maximum acceptable adapted model error. R is the ratio validating acceptance of the current adapted model. A heuristic value of approximately 10 is used for adaptive model with parameter interpolation.

When adaptation involves comparing several models, the error ratio of the best model and the closest to the best also indicates the quality of the model and may be considered in model validation. Generally, the validation is performed to prevent instability of the loop tuned with the newly adapted model. An adapted model is defined as "good", "uncertain", or "bad". This status may then be used for process control loop tuning in the diagnostics.

In an alternative example, model quality in an adaptive process control loop may be evaluation based on factors such as the number of adaptations, average filter factor, and model main parameter (gain) average value and variability of the last number, n, adaptations of that parameter. In particular, the filter factor (FF) may be calculated for every adapted parameter. The criteria used for the filter factor calculation may include a ratio of the maximum residual error to the minimum residual error (RE) and a test to determine if the model with a middle value parameter value has the smallest residual error. If the ratio is small, it implies high noise level or a significant distance from the true model value. If the ratio, is high it indicates a small noise level and/or fast convergence of the model parameters. Satisfaction of the test criteria indicates that true model value lies between low and high range of the parameter and an interpolated parameter value should be close to the true value.

The filter factor, FF, for the model parameter may be calculated as follows:

$$\varepsilon_k(i) = y(i) - \bar{y}_k(i) \qquad \text{(eq. 45)}$$

$$\varepsilon_k^2 = \sum_{i=1}^{n} \frac{\varepsilon_k^2(i)}{n} \qquad \text{(eq. 46)}$$

$$E_{max} = \max_k(\varepsilon_k^2) \qquad \text{(eq. 47)}$$

$$E_{min} = \min_k(\varepsilon_k^2) \qquad \text{(eq. 48)}$$

$$FF = \sqrt{s\left(A + B\left(1 - \frac{E_{min}}{E_{max}}\right)\right)} \qquad \text{(eq. 49)}$$

where k=1, 2, 3, . . . with k being the model number, i=1, . . . n with n being the number of samples, s is a scaling factor, and A and B are adjustable heuristic constants defined from the test to determine if the model with a middle value parameter value has the smallest residual error. If the test is satisfied (i.e., $E_{min}=\epsilon_2^2$), then, for example, A=0.1 and B=0.5. Otherwise, A=0.05 and B=0.25, although the values for A and B may be adjusted experimentally. The scaling factor, s=0.33 for a self-regulating process and s=0.4 for an integrating process.

The defined filter factor uses the errors ratio accounting automatically for noise level and excitation signal level. As noise level increases, or as excitation signal level decreases, the ratio of the modeling errors for various parameters decreases. The filter factor is sequentially calculated for every adapted parameter and then the filter factor for the model of a self-regulating process is calculated as follows:

$$FF(\text{model})=0.6*FF(\text{gain})+0.2*FF(TC)+0.2*FF(DT) \qquad \text{(eq. 50)}$$

For an integrating process, the filter factor for the model is calculated as:

$$FF(\text{model})=0.7*FF(\text{gain})+0.3*FF(DT) \qquad \text{(eq. 51)}$$

The model quality calculations may be calculated by calculating the dispersion (min and max) for the last n adapted parameters, where n may be adjustable but in the example below n=5:

$$\min\{\text{Gain}(i)\}, \max\{\text{Gain}(j)\} \qquad \text{(eq. 52)}$$

where $i \geq k-5$ and $j \geq k-5$, with k being the current adaptation number. Then:

$$\text{var} = \frac{\max(\text{Gain}(j)) - \min(\text{Gain}(i))}{2} \qquad \text{(eq. 53)}$$

$$r = \min\left\{1, \frac{\text{var}}{\text{avgGain}}\right\} \qquad \text{(eq. 54)}$$

where avgGain is the last filtered gain. If there is less than five models (k<5), then:

$$r = \min\left\{1, r + \frac{5-i}{5}\right\} \qquad \text{(eq. 55)}$$

where i is the number of models. The model quality, MQ, accounting for r is:

$$MQ=\max\{0.3, MQ\} \qquad \text{(eq. 56)}$$

$$MQ=MQ*(A+0.25*r)+\sin[3.0*FF(\text{model})]*(1-A-0.25*r) \qquad \text{(eq. 57)}$$

wherein A=0.5. Equation 57 may be modified to eliminate the sine calculation, such that:

$$MQ=\max\{0.4, MQ\} \qquad \text{(eq. 58)}$$

$$MQ=MQ*(A+0.25*r)+1.2\sqrt{FF}*(1-A-0.25*r) \qquad \text{(eq. 59)}.$$

The values of coefficients may be adjusted to satisfy requirements of particular implementations.

Noise may be accounted for on various levels, including model validation and excitation level. Model validation, as explained above, accounts for noise by developing the noise-dependent filter factor, FF. With higher noise or smaller excitations, FF is smaller. The excitation level is tested versus the noise/disturbance level. The following noise protection may be applied:

$$\text{level(NOL)}=\max\{\text{stdev}, \text{stdev\_cap}\} \qquad \text{(eq. 60)}$$

where stdev and stdev_cap are PID controller parameters of total standard deviation and capability standard deviation. The triggering events for the adaptation may be verified as min Delta SP>5*NOL, min Delta OUT>5*NOL*gain(PID), and min PULSE ampl.>7*NOL*gain(PID). Noise may be further accounted for by adjusting the time to steady state, $T_{ss}$, by noise dependent factor:

$$T'_{ss}=T_{ss}(1+2*\text{stdev\_cap}) \qquad \text{(eq. 61)}.$$

An oscillation index may indicate the stability of the process control loop. In particular, the oscillation index is a priority indicator of the overall process control loop), the value of which may be used to alert an operator to promptly attend to an unstable process control loop. Detection and evaluation of oscillations in a process control loop can be performed in a variety of ways that are suitable to obtain the amplitude and period of the oscillations. The oscillation status is then defined according to no oscillations (e.g., "Good"), oscillation exceeded minimum acceptable amplitude (e.g., "Uncertain"), and oscillations exceeding maximum acceptable amplitude (e.g., "Bad").

The main diagnostic routine 600 evaluates loop conditions based on the status of the process control loop components (e.g., process control loop performance, process control loop device, adapted model quality and process control loop stability), and performs a function as a result of the evaluation, such as initiating a corrective action or setting alarms. For example, alarming status is set for oscillatory process control loops, as well as for excessively high estimated valve hysteresis and low resolution.

An example of a corrective action within a process control loop includes accounting for the diagnosed conditions during model acceptance. Another example of a corrective action includes filtering data used for control and identification unintended for improving the next model identification. If the adapted model is "bad", the results of the model are rejected. If "uncertain", the model is partially accepted. In other words, the parameters of the actual process control loop model are calculated as a weighted average of adapted and actually used models. The model quality index is used in the process variable filter calculation.

Process variable filtering for control is adjusted automatically and asynchronously to the adaptive procedure. The filter value is set based on the model identification status and the current value of the process model dead time, time constant and noise level defined by the process control loop parameters (e.g., capability standard deviation and total standard deviation). Filter adjustments are made periodically, not faster than once over time-to-steady-state period, $T_{ss}$. The following heuristic formula may be used for the filter time constant calculation:

$$\tau_f \text{ new} = \phi \frac{STDEV\_CAP}{STDEV} \min\{\alpha\tau_d, \beta\tau\} \qquad (\text{eq. 45})$$

where $\tau_d$ is the process model dead time, $\tau$ is the process model time constant, and ø is the quality of the last adapted model. STDEV is the total standard deviation, and STDEV_CAP is the capability standard deviation. The quality of the last adapted model, ø, is equal to 0 if the last model status is "good", equal to 1 if last model status is "uncertain", and equal to 2 if the last month status is "bad". To avoid drastic filter changes, effective filter values may be applied as:

$$\tau_f = 0.8\tau_f \text{old} + 0.2\tau_f \text{new} \qquad (\text{eq. 46}).$$

If the process variable filter is applied for both model identification and control, no model correction after the identification may be avoided. If the process variable filter for both the process variable, PV, and controller output, OUT, is used only for the identification, then both the process variable and process control loop controller output filters are the same and are selected by applying the procedures provided above. There is an assumption that model correction is not required because both process input and output data are delayed on the same value.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

While the diagnostic system and method, and other elements, may be implemented in software, they may also be implemented in hardware, firmware, etc., and may be implemented by any other processor. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of diagnosing an adaptive process control loop comprising:
    measuring process control loop signal data generated as a result of a normal operation of one or more process control devices within the adaptive process control loop when the adaptive process control loop is connected on-line within a process control environment;
    asynchronously diagnosing on a computer a plurality of components of the adaptive process control loop from the process control loop signal data;
    generating on the computer a plurality of diagnostic indices pertaining to process control loop parameters for a plurality of components of the adaptive process control loop from diagnostic results of the component generated from the process control loop signal data, wherein generating a plurality of diagnostic indices comprises generating an index for one or more of the group consisting of: a resolution of a process control loop device within the adaptive process control loop, a dead band of a process control loop device within the adaptive process control loop and a hysteresis of a process control loop device within the adaptive process control loop; and
    evaluating on the computer a condition of the adaptive process control loop from one or more of the plurality of diagnostic indices.

2. The method of claim 1, wherein generating a plurality of diagnostic indices comprises independently generating a diagnostic index for a plurality of components of the adaptive process control loop.

3. The method of claim 2, wherein the components of the adaptive process control loop comprises one or more of the group consisting of: a process control loop performance component, a process control loop device component, an adaptive model quality component and a process control loop stability component.

4. The method of claim 1, wherein generating a plurality of diagnostic indices further comprises:
    generating a diagnostic index representing a status of each of the one or more process control devices within the adaptive process control loop; and
    generating a diagnostic index representing a status of the complete adaptive process control loop.

5. The method of claim 1, wherein generating a plurality of diagnostic indices further comprises generating one or more use indices indicating the performance of the adaptive process control loop.

6. The method of claim 1, wherein generating a plurality of diagnostic indices further comprises generating one or more of the group consisting of: a variability index, a standard deviation and a capability standard deviation.

7. The method of claim 6, wherein generating the variability index comprises generating one or more of the group consisting of: a variability index indicating a process control loop tuning condition and a variability index indicating a process control loop device condition.

8. The method of claim 6, wherein generating the standard deviation comprises generating one or more of the group consisting of: a total process variable standard deviation indicating a process control loop tuning condition and a total process variable standard deviation indicating a process control loop device condition.

9. The method of claim 1, wherein generating a plurality of diagnostic indices further comprises generating one or more use indices indicating a diagnostic of a process control device within the adaptive process control loop.

10. The method of claim 1, wherein generating an index for a resolution of a process control loop device in the adaptive process control loop comprises generating an index for a resolution indicating a measure of a minimum process control signal required to cause a response in the process control loop device.

11. The method of claim 1, wherein generating an index for a resolution of a process control loop device in the adaptive process control loop comprises calculating the difference between the hysteresis of the process control loop device and the dead band of the process control loop device.

12. The method of claim 1, wherein generating an index for a dead band of a process control loop device within the adaptive process control loop comprises generating a dead band indicating a measure of a range an input can vary without an observable response in the process control loop device in response to a process control signal.

13. The method of claim 1, wherein generating an index for a dead band of a process control loop device within the adaptive process control loop comprises calculating the difference between the hysteresis of the process control loop device and the resolution of the process control loop device.

14. The method of claim 1, wherein generating an index for a hysteresis of a process control loop device within the adaptive process control loop comprises measuring displacement of the process control loop device based on an input to the process control loop device and an output of the process control loop device.

15. The method of claim 1, wherein generating an index for a hysteresis of a process control loop device within the adaptive process control loop comprises calculating a sum of the dead band of the process control loop device and the resolution of the process control loop device.

16. The method of claim 1, wherein generating an index for a hysteresis of a process control loop device within the adaptive process control loop comprises calculating an average of maximum differences between a process control input signal to the process control loop device and a response signal indicating a state of the process control loop device in response to the process control input signal.

17. The method of claim 1, wherein generating a plurality of diagnostic indices comprises:
   determining an oscillation amplitude on a process control output signal; and
   determining an oscillation amplitude on a process control input signal.

18. The method of claim 17, wherein generating an index for a hysteresis of a process control loop device within the adaptive process control loop comprises calculating the hysteresis of a process control devices as the product of a constant value and the oscillation amplitude on the process control output signal.

19. The method of claim 17, wherein generating an index for a resolution of a process control loop device within the adaptive process control loop comprises calculating the resolution of a process control loop device as a ratio of the oscillation amplitude on the process control input signal to a process gain, wherein the ratio is scaled a constant value.

20. The method of claim 17, wherein generating an index for a dead band of a process control loop device within the adaptive process control loop comprises calculating the difference between the hysteresis of the process control loop device and the resolution of the process control loop device.

21. The method of claim 1, wherein generating a plurality of diagnostic indices further comprises generating an index indicating a quality of a model of the adaptive process control loop defined during an adaptation cycle of the adaptive process control loop.

22. The method of claim 21, wherein generating an index indicating a quality of an adapted model of the adaptive process control loop comprises comparing a final model output with an actual process variable of the adaptive process control loop.

23. The method of claim 21, wherein generating an index indicating a quality of an adapted model of the adaptive process control loop comprises calculating an error ratio of the best model of the adaptive process control loop to a next best model of the adaptive process control loop.

24. The method of claim 21, wherein generating an index indicating a quality of an adapted model of the adaptive process control loop comprises calculating a squared error of the adapted model of the adaptive process control loop indicating the error from a previous adaptation cycle of the adaptive process control loop.

25. The method of claim 1, wherein generating a plurality of diagnostic indices further comprises generating an index indicating a stability of the adaptive process control loop.

26. The method of claim 1, further comprising performing a function based on the evaluated condition of the adaptive process control loop.

27. The method of claim 26, wherein performing a function based on the evaluated condition of the process control loop comprises setting an alarm.

28. The method of claim 27, wherein setting an alarm comprises setting an alarm for at least one of the group consisting of: an oscillatory adaptive process control loop, a high process control loop device hysteresis and a high process control loop device resolution value.

29. The method of claim 26, wherein performing a function based on the evaluated condition of the process control loop comprises performing a corrective action within the adaptive process control loop.

30. The method of claim 29, wherein performing a corrective action comprises automatically adjusting a process variable filter.

31. A self-diagnostic process control loop within a process control environment comprising:
   a plurality of process control loop devices;
   a memory adapted to store signal data from the process control loop, wherein the signal data is generated as a result of a normal operation of the plurality of process control devices within the process control loop when the process control loop is connected on-line within a process control environment; and
   a diagnostic tool adapted to receive one or more diagnostic indices pertaining to a process control loop parameter for a plurality of components of the process control loop, including a diagnostic index pertaining to a diagnostic of a process control device within the process control loop, and for the complete process control loop, wherein each diagnostic index is generated from the signal data by a corresponding index computation tool and wherein the diagnostic index pertaining to a diagnostic of a process control device within the process control loop comprises one or more of the group consisting of: a resolution of a process control loop device within the process control loop indicating a minimum process control signal required to cause a response in the process control loop device, a dead band of a process control loop device within the process control loop indicating a measure of a range an input can vary without an observable response in the process control loop device in response to a process control signal and a hysteresis of a process control loop device within the process control loop indicating a displacement of a process control loop device based on an input to the process control loop device and an output of the process control loop device, the diagnostic tool further adapted to evaluate a condition of the process control loop from one or more of the diagnostic indices.

32. The self-diagnostic process control loop of claim 31, wherein the components of the process control loop comprises one or more of the group consisting of: a process control loop performance component, a process control loop device component, an adaptive model quality component and a process control loop stability component.

33. The self-diagnostic process control loop of claim 31, wherein the diagnostic tool is further adapted to receive a diagnostic index pertaining to a performance of the process control loop.

34. The self-diagnostic process control loop of claim 33, wherein the diagnostic index pertaining to a performance of the process control loop comprises a variability index indicating a process control loop tuning condition.

35. The self-diagnostic process control loop of claim 33, wherein the diagnostic index pertaining to a performance of the process control loop comprises a variability index indicting a process control loop device condition.

36. The self-diagnostic process control loop of claim 33, wherein the diagnostic index pertaining to a performance of the process control loop comprises a total process control loop standard deviation indicating a process control loop tuning condition.

37. The self-diagnostic process control loop of claim 33, wherein the diagnostic index pertaining to a performance of the process control loop comprises a total process control loop standard deviation indicating a process control loop device condition.

38. The self-diagnostic process control loop of claim 33, wherein the diagnostic index pertaining to a performance of the process control loop comprises a capability standard deviation.

39. The self-diagnostic process control loop of claim 31, wherein the diagnostic tool is further adapted to calculate a diagnostic index pertaining to a diagnostic of a process control device within the process control loop based on a back calculation signal from a process control loop device.

40. The self-diagnostic process control loop of claim 31, wherein the diagnostic tool is further adapted to receive a diagnostic index pertaining to a quality of an adapted model of the process control loop defined during an adaptation cycle of the process control loop.

41. The self-diagnostic process control loop of claim 40, wherein the diagnostic tool is further adapted utilize the diagnostic index as a diagnostic indicator of the process control loop.

42. The self-diagnostic process control loop of claim 31, wherein the diagnostic tool is further adapted to receive a diagnostic index pertaining to a stability of the process control loop.

43. The self-diagnostic process control loop of claim 31, wherein the diagnostic routine is further adapted to set an alarm based on the evaluated condition of the process control loop.

44. The self-diagnostic process control loop of claim 43, wherein the diagnostic routine is adapted to set the alarm for at least one of the group consisting of: an oscillatory process control loop, a high process control loop device hysteresis and a high process control loop device resolution value.

45. The self-diagnostic process control loop of claim 31, wherein the diagnostic routine is further adapted to initiate a corrective action within the process control loop based on the evaluated condition of the process control loop.

46. The self-diagnostic process control loop of claim 45, wherein the diagnostic routine is adapted to initiate a corrective action to automatically adjust an adapted model of the process control loop.

47. The self-diagnostic process control loop of claim 45, wherein the diagnostic routine is adapted to initiate a corrective action to automatically adjust a process variable filter.

48. The self-diagnostic process control loop of claim 31, wherein the plurality of process control loop devices comprise a valve and a process controller.

\* \* \* \* \*